United States Patent [19]

Sprang et al.

[11] Patent Number: 5,571,604
[45] Date of Patent: Nov. 5, 1996

[54] ADSORBENT FIBROUS NONWOVEN COMPOSITE STRUCTURE

[75] Inventors: Troy A. Sprang, Alpharetta; Annmarie V. Douglas, Norcross; Benji D. Morgan, Atlanta, all of Ga.

[73] Assignee: Kimberly-Clark Corporation, Neenah, Wis.

[21] Appl. No.: 409,105

[22] Filed: Mar. 24, 1995

Related U.S. Application Data

[63] Continuation of Ser. No. 151,609, Nov. 12, 1993, abandoned.

[51] Int. Cl.$^6$ ................................ B32B 5/16; A24D 3/04
[52] U.S. Cl. .................. 428/212; 428/219; 428/280; 428/281; 428/283; 428/284; 428/296; 428/408; 55/524; 55/DIG. 44; 264/113; 264/121; 264/517
[58] Field of Search ........................ 428/281, 296, 428/212, 218, 280, 283, 284, 296, 408; 55/524, DIG. 44; 264/113, 121, 517

[56] References Cited

U.S. PATENT DOCUMENTS

| | | | |
|---|---|---|---|
| 3,149,023 | 9/1964 | Bodendorf et al. | 162/135 |
| 4,289,513 | 9/1981 | Brownhill et al. | 55/387 |
| 4,927,582 | 5/1990 | Bryson | 264/113 |
| 5,074,321 | 12/1991 | Gentry et al. | 131/352 |
| 5,137,034 | 8/1992 | Perfetti et al. | 131/194 |
| 5,161,686 | 11/1992 | Weber et al. | 206/440 |
| 5,271,419 | 12/1993 | Arzonico et al. | 131/356 |
| 5,360,023 | 11/1994 | Blakley et al. | 131/331 |

FOREIGN PATENT DOCUMENTS

| | | |
|---|---|---|
| 0342538 | 11/1989 | European Pat. Off. . |
| 961636 | 6/1964 | United Kingdom ............ 162/158 |

OTHER PUBLICATIONS

Prior Sale of Carbon–Containing Paper Sheets.
The Taryton© Cigarette Filter.

*Primary Examiner*—Patrick J. Ryan
*Assistant Examiner*—Rich Weisberger
*Attorney, Agent, or Firm*—Karl V. Sidor

[57] ABSTRACT

Disclosed is an adsorbent fibrous nonwoven structure composed of (1) a matrix of pulp fibers having a first exterior surface and a second exterior surface; and (2) an adsorbent material integrated into the pulp fiber matrix so that the concentration of adsorbent material adjacent the first exterior surface of the nonwoven structure is at least about 60 percent, as determined by optical image analysis, and the concentration of adsorbent material adjacent the second exterior surface is less than about 40 percent, as determined by optical image analysis. This adsorbent nonwoven structure provides useful strength and low-lint characteristics. The fibrous nonwoven structure of the present invention may be laminated together or to surfaces of other materials.

17 Claims, 3 Drawing Sheets

ADSORBENT FIBROUS NONWOVEN COMPOSITE STRUCTURE

This application is a continuation of application Ser. No. 08/151,609 entitled "Adsorbent Fibrous Nonwoven Composite Structure" and filed in the U.S. Patent and Trademark Office on Nov. 12, 1993, abandoned.

FIELD OF THE INVENTION

The present invention relates to an adsorbent fibrous nonwoven structure composed of at least two different components and a method for making an adsorbent fibrous nonwoven structure.

BACKGROUND

Fibrous nonwoven materials and fibrous nonwoven composite materials are widely used as products, or as components of products because they can be manufactured inexpensively and made to have specific characteristics. One approach to making fibrous nonwoven composite materials has been to join different types of nonwoven materials in a laminate.

The integrity of laminate materials described above depends in part on the techniques used to join the layers of the laminate. One disadvantage is that some effective bonding techniques add expense to the laminate materials and complexity to the manufacturing processes.

Fibrous nonwoven composites which contain a generally uniform distribution of component materials can have disadvantages which are related to the arrangement of the components. In particular, uniform distribution of certain fibers and particulates may promote linting and/or particle shedding. Another disadvantage is that composites which contain large proportions of uniformly distributed particulates or small fibers (e.g., pulp) generally have less integrity because less strength is provided by the fiber matirx. This phenomenon can be seen in poor abrasion resistance and tensile strength properties of generally homogeneous composites containing large proportions of adsorbents and/or particulates. This problem is particularly apparent when such a nonwoven composite is exposed to abrasion and/or tearing forces. However, since adsorbent sheets can be very useful, it is often highly desirable to incorporate large proportions of adsorbent materials in fibrous nonwoven composite structures.

Accordingly, there is a need for an adsorbent fibrous nonwoven composite structure which is inexpensive but has good abrasion resistance, integrity and strength characteristics. There is also a need for a fibrous nonwoven composite structure which has a relatively high adsorbent content and is inexpensive but has good abrasion resistance, integrity and linting or particle shedding characteristics.

DEFINITIONS

As used herein, the term "fibrous nonwoven structure" refers to a structure of individual fibers or filaments which are interlaid, but not in an identifiable repeating manner. Nonwoven structures such as, for example, fibrous nonwoven webs have been, in the past, formed by a variety of processes known to those skilled in the art including, for example, wet-formation papermaking processes, air-forming process, and carding processes.

As used herein, the term "adsorbent fibrous nonwoven composite structure" refers to a combination of pulp fibers and at least one adsorbent component (e.g., adsorbent fibers and/or particulates) in the form of a fibrous nonwoven structure that provides adsorbent properties. Generally speaking, an adsorbent fibrous nonwoven structure should be capable of adsorbing an amount of carbon tetrachloride ($CCl_4$) vapor sufficient to increase the basis weight of the nonwoven structure by at least about one and one-half grams per square meter (i.e., 1.5 gsm). For example, an adsorbent fibrous nonwoven structure should be capable of adsorbing an amount of carbon tetrachloride ($CCl_4$) vapor sufficient to increase the basis weight of the nonwoven structure by about 10 to about 20 grams per square meter (i.e., 10–20 gsm). Desirably, an adsorbent fibrous nonwoven structure should be capable of adsorbing an amount of carbon tetrachloride ($CCl_4$) vapor sufficient to increase the basis weight of the nonwoven structure by 25 grams per square meter or more (i.e., 25 gsm or more).

As used herein, the term "pulp" refers to cellulose containing fibers from natural sources such as woody and non-woody plants. Woody plants include, for example, deciduous and coniferous trees. Non-woody plants include, for example, cotton, flax, esparto grass, milkweed, straw, jute hemp, and bagasse.

The term "machine direction" as used herein refers to the direction of travel of the forming surface onto which fibers are deposited during formation of an nonwoven web.

The term "cross-machine direction" as used herein refers to the direction which is perpendicular to the machine direction defined above.

The term "wet-end suspension additive" as used herein refers to a material added to an aqueous suspension of fibers (or fibers and particulates) at the wet-end of a papermaking process. The purpose of the suspension additive is to enhance uniformity or homogeneity of the fiber (or fiber/particulate) distribution in a wet-laid fibrous sheet and to promote bonding of fibers (or fibers and particulates) in the sheet. Some types of cationic surfactants may be used as wet-end suspension additives.

The term "wet-end retention additive" as used herein refers to a material added to an aqueous suspension of fibers (or fibers and particulates) at the wet-end of a papermaking process. The purpose of the retention additive is to increase the amount of fibers and/or particulates caught by the forming fabric when the aqueous suspension is deposited on the forming fabric during the papermaking process. Generally speaking, wet-end retention additives do not enhance uniformity or homogeneity of the fiber (or fiber/particulate) distribution in a wet-laid fibrous sheet. One useful wet-end retention additive is polyacrylamide.

As used herein, the term "consisting essentially of" does not exclude the presence of additional materials which do not significantly affect the desired characteristics of a given composition or product. Exemplary materials of this sort would include, without limitation, pigments, antioxidants, stabilizers, surfactants, waxes, flow promoters, particulates or materials added to enhance processability of a composition.

SUMMARY OF THE INVENTION

The present invention responds to the needs described above by providing an adsorbent fibrous nonwoven structure composed of (1) a matrix of pulp fibers having a first exterior surface and a second exterior surface; and (2) at least one adsorbent material integrated into the pulp fiber matrix so that the concentration of adsorbent material adjacent the first exterior surface of the nonwoven structure is at least about 60 percent, as determined by optical image analysis, and the concentration of adsorbent material adjacent the second exterior surface of the nonwoven structure is less than about 40 percent, as determined by optical image analysis. Desirably, the adsorbent material concentration adjacent the first exterior surface is from about 65 to about 85 percent, as determined by optical image analysis, and the concentration of adsorbent adjacent the second exterior surface is from about 45 to about 15 percent, as determined by optical image analysis.

Generally speaking, the adsorbent fibrous nonwoven composite structure is composed of from about 20 to about 90 percent, by weight pulp fibers and from about 10 to about 80 percent, by weight, adsorbent material, based on the total weight of the structure. Desirably, the structure contains from about 40 to about 80 percent, by weight pulp fibers and from about 20 to about 60 percent, by weight, adsorbent material, based on the total weight of the structure.

According to one aspect of the present invention, the adsorbent fibrous nonwoven structure is adapted to adsorb an amount of carbon tetrachloride ($CCl_4$) vapor sufficient to increase the basis weight of the nonwoven structure by at least about one and one-half grams per square meter (i.e., 1.5 gsm). For example, the adsorbent fibrous nonwoven structure can be adapted to adsorb an amount of carbon tetrachloride ($CCl_4$) vapor sufficient to increase the basis weight of the nonwoven structure by about 10 to about 20 grams per square meter (i.e., 10–20 gsm). Desirably, the adsorbent fibrous nonwoven structure is adapted to adsorb an amount of carbon tetrachloride ($CCl_4$) vapor sufficient to increase the basis weight of the nonwoven structure by 25 grams per square meter or more (i.e., 25 gsm or more).

The adsorbent fibrous nonwoven composite structure may have a basis weight ranging from about 20 to about 500 grams per square meter. Desirably, the fibrous nonwoven structure may have a basis weight ranging from about 35 to about 150 grams per square meter. Even more desirably, the fibrous nonwoven structure may have a basis weight ranging from about 40 to about 90 grams per square meter. Two or more layers of the fibrous nonwoven structure may be combined to provide multi-layer materials having desired basis weights and/or functional characteristics.

The adsorbent material is an adsorbent selected from activated carbon, activated charcoal, molecular sieves and polymer microsponges. Desirably, the adsorbent material is an activated carbon. More desirably, the adsorbent material is an activated carbon having an average particle size of about 0.0017 inch (about 44 microns).

Generally speaking, the adsorbent fibrous nonwoven composite has a lint loss of less than about 6250 particles of 10 micron size per 0.01 $ft^3$ of air as determined in accordance with dry Climet Lint test methods. For example, the adsorbent composite has a lint loss of less than about 4000 particles of 10 micron size per 0.01 $ft^3$ of air. Desirably, the adsorbent composite has a lint loss of less than about 2000 particles of 10 micron size per 0.01 $ft^3$ of air. In another aspect of the invention, the adsorbent fibrous nonwoven composite has a lint loss of less than about 140000 particles of 0.5 micron size per 0.01 $ft^3$ of air as determined in accordance with dry Climet Lint test methods. For example, the adsorbent composite has a lint loss of less than about 120000 particles of 0.5 micron size per 0.01 $ft^3$ of air. Desirably, the adsorbent composite has a lint loss of less than about 90000 particles of 0.5 micron size per 0.01 $ft^3$ of air.

According to the present invention, the adsorbent fibrous nonwoven structure may be laminated with itself or with other materials. Generally speaking, the strength characteristics will vary according to the basis weight and absorbent content of the fibrous nonwoven structure.

In yet another aspect of the present invention, there is provided an adsorbent fibrous nonwoven composite structure composed of (1) from about 20 to about 90 total weight percent, pulp fibers forming a matrix having a first exterior surface and a second exterior surface; and (2) from about 10 to about 80, total weight percent, adsorbent material integrated into the pulp fiber matrix so that the concentration of adsorbent material adjacent the first exterior surface of the nonwoven structure is at least about 60 percent, as determined by optical image analysis, and the concentration of adsorbent material adjacent the second exterior surface is less than about 40 percent, as determined by optical image analysis.

The present invention also encompasses a process of making an adsorbent fibrous nonwoven composite structure. The process includes the following steps (1) providing an aqueous suspension of pulp fibers and at least one adsorbent material, the suspension being free of wet-end suspension additives; (2) depositing the aqueous suspension onto a paper-making forming surface to form a layer of fibers and adsorbent material; (3) removing water from the layer under sufficient vacuum so that adsorbent material is concentrated near one surface of the layer to yield an adsorbent fibrous nonwoven composite structure having a first exterior surface and a second exterior surface so that the concentration of adsorbent material adjacent the first exterior surface of the nonwoven structure is at least about 60 percent, as determined by optical image analysis, and the concentration of adsorbent material adjacent the second exterior surface of the nonwoven structure is less than about 40 percent, as determined by optical image analysis.

According to the method of the present invention, the aqueous suspension may contain from about 20 to about 90 percent, by weight pulp fibers and from about 10 to about 80 percent, by weight, adsorbent material, based on the total weight of the suspended material. For example, the aqueous suspension may contain from about 40 to about 80 percent, by weight pulp fibers and from about 20 to about 60 percent, by weight, adsorbent material, based on the total weight of the suspended material.

In another aspect of the method of the present invention, the adsorbent nonwoven structure may be dried utilizing a compressive or non-compressive drying process. Steam can or steam roll drying processes have been found to work particularly well. Other drying processes which incorporate infra-red radiation, yankee dryers, through-air dryers, microwaves, and ultrasonic energy may also be used.

DETAILED DESCRIPTION OF THE INVENTION

Figure 1:
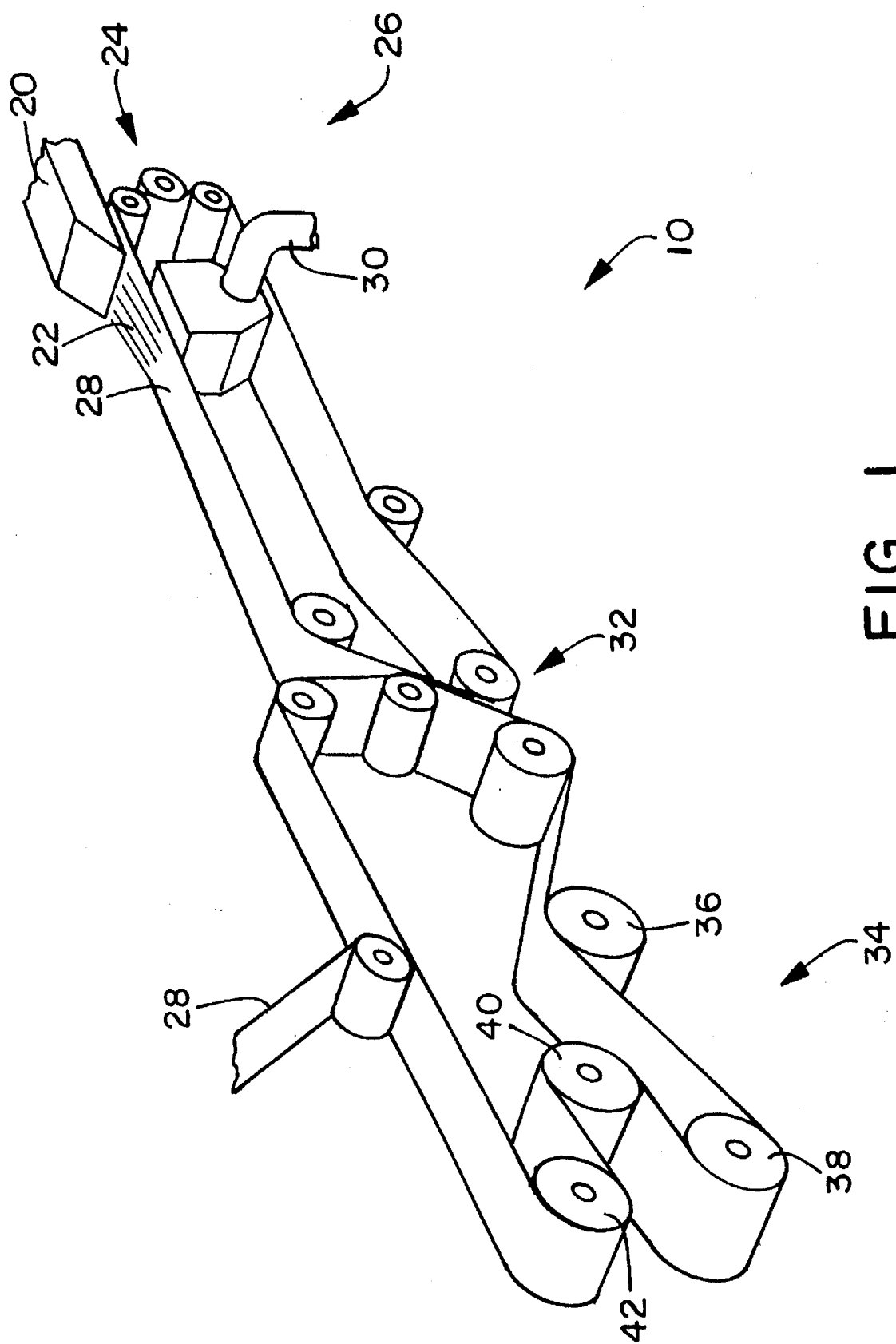
FIG. 1 is an illustration of an apparatus which may be used to form an abrasion resistant fibrous nonwoven composite structure.

Referring to FIG. 1 of the drawings there is schematically illustrated at 10 a process for forming an adsorbent nonwoven composite material. This composite includes pulp fibers and adsorbent materials.

The nonwoven fibrous web is made by forming a dilute suspension of fibers and adsorbent materials, supplying that suspension to a headbox 20 and depositing it via a slice 22 as a slurry onto a foraminous screen 24 of a conventional papermaking machine 26.

The suspension of fibers may be diluted to any consistency which is typically used in conventional wet-laying processes. For example, the suspension may contain from about 0.02 to about 5 percent by weight fibers and/or adsorbent suspended in water.

Generally speaking, adsorbent material is blended in the pulp slurry prior to formation of the sheet. Alternatively and/or additionally, the adsorbent materials may be deposited in the pulp slurry as it enters the headbox, while in the slice or as it is deposited on the foraminous screen.

The suspension of fibers and adsorbent material is deposited on the foraminous surface 24 and water is removed to form a non-uniform nonwoven web of fibers and adsorbent material 28. Typically, the foraminous surface 24 is a mesh fabric used in conventional papermaking processes. Water is removed from the deposited layer of fibers and adsorbent material by vacuum dewatering equipment 30 under sufficient vacuum so that an enhanced two-sided or non-homogenous web is formed.

The adsorbent materials may be in the form of adsorbent particles or adsorbent fibers. The adsorbent material may be formed from an organic material such as, for example, activated carbon or activated charcoal. The adsorbent material may also be molecular sieves and/or polymer microsponges and mixtures of the same. Suitable molecular sieve materials are available from various commercial vendors, such as the PQ corporation of Valley Forge, Pa. Suitable polymer microsponges are available from commercial vendors, such as Advanced Polymer Systems. Suitable useful activated carbon particles are available from the Calgon Carbon of Pittsburgh, Pa. under the designation Calgon Carbon Type PCB Granular Activated Carbon.

An important aspect of the present invention is that no wet-end suspension additives are added to the aqueous suspension of pulp fibers and adsorbent material. Wet-end suspension additives are typically formed from an organic material such as, for example, natural gums, as well as synthetic materials such as synthetic hydrogel polymers or hydrophilic colloids (also referred to as "hydrocolloids").

Although the inventors should not be held to a particular theory of operation, it is believed that by removing wet-end suspension additives that promote uniform dispersion of adsorbent in the suspension of pulp and adsorbent, a two-sided or heterogenous distribution of adsorbent is achieved in the resulting sheet. Absence of wet-end suspension additives is believed to increase the tendency of the adsorbent material in a slurry processed by a Fourdrinier-type papermaking machine to be concentrated by the effects of gravity, mixing, sheet formation, and/or dewatering.

Adsorbent particles and/or fibers are added to the pulp slurry by a conventional particulate and/or fiber handling system (not shown) to form the aqueous suspension of adsorbent material and pulp fibers. Exemplary particulate handling systems are described in, for example, U.S. Pat. No. 4,604,313, the contents of which regarding particulate handling systems is incorporated herein by reference. Useful particulate handling systems include various engraved roll volumetric feeders as well as other commercial systems such as, for example, Christy dry material dispensing machines available from the Christy Machine Company of Fremont, Ohio; and Meltex™ SAP series powder application systems available from the Nordson Corporation. Useful fiber handling systems include staple fiber web air-forming systems as well as commercial systems available from Moller & Jochumsen of Denmark and Danweb Forming International.

Generally speaking, adsorbents may be present at a proportion of up to about 80 grams of adsorbent per 100 grams total weight of the substantially dry composite material. For example, the nonwoven web may contain from about 15 to about 65 grams of adsorbent per 100 grams total weight of the substantially dry composite material. More particularly, the nonwoven web may contain about 40 to about 50 grams of adsorbent per 100 grams total weight of the substantially dry composite material.

The fibers may be pulp fibers from woody or non-woody plants as well as secondary (i.e., recycled) fiber pulp. Exemplary wood pulps include bleached and unbleached kraft virgin softwood fiber pulps and bleached and unbleached kraft virgin hardwood pulp. Some useful pulps are those available from the Kimberly-Clark Corporation under the trade designations Alberni K, Longlac 19, Longlac 16, Coosa River 55, Coosa River 56, and Coosa River 57. Secondary fiber pulp may be pulp fibers recycled from sources such as, for example, office waste, newsprint, and paperboard scrap. For example, one useful secondary fiber pulp identified as "BJ de-inked secondary fiber pulp" is available from Ponderosa Pulp Products—a division of Ponderosa Fibers of America, Atlanta, Ga.

Pulp fibers may be unrefined or may be beaten to various degrees of refinement. Small amounts of wet-strength resins and/or resin binders may be added to improve strength and abrasion resistance provided they do not change the heterogenous nature of the pulp/adsorbent material distribution achieved by eliminating the wet-end suspension additives described above. Useful binders and wet-strength resins include, for example, Kymene® 557 H available from the Hercules Chemical Company, and Parez 631 available from American Cyanamid, Inc. Cross-linking agents and/or hydrating agents may also be added to the pulp mixture. Debonding agents may be added to the pulp mixture to reduce the degree of hydrogen bonding if a very open or loose (e.g., softer) nonwoven pulp fiber web is desired. One exemplary debonding agent is available from the Quaker Chemical Company, Conshohocken, Pa., under the trade designation Quaker 2008.

If the fibers are pulp fibers, the suspension of fibers and adsorbent material may also contain synthetic fibers, natural fibers, bicomponent fibers, or continuous filaments having various deniers and lengths. Various mixtures of pulp fibers and these other types of fibers may be used. For example, the fibrous component of the adsorbent composite material may contain from about 5 to about 50 percent, by weight, staple length fibers and from about 50 to 95 percent, by weight pulp fibers.

The synthetic fibers may be made from rayon, polyester, polyamides and polyolefins such as, for example, one or more of polyethylene, polypropylene, polybutene, ethylene copolymers, propylene copolymers and butene copolymers. Natural fibers may include, for example, cotton, cotton linters, wool, silk, and flax. Typically, these fibers will have a denier in the range of about 0.7 to about 8 and an average length in the range of about 5 mm to about 36 mm. For example, the fibers may have a denier in the range of about 0.9 to about 3 and an average length in the range of about 10 mm to about 24 mm. Desirably, the fibers may have a denier in the range of about 1 to about 2 and an average length in the range of about 12 mm to about 18 mm.

After the water is drained from the adsorbent fibrous nonwoven composite material 28, it is transferred to a drying operation. A differential speed pickup roll 32 may be used to transfer the web from the foraminous belt 24 to a drying operation. Alternatively, conventional vacuum-type pickups and transfer fabrics may be used. Desirably, the drying operation is a non-compressive drying operation. For example, the web may be non-compressibly dried utilizing a conventional steam can or steam roll arrangement shown in FIG. 1 at 34. The adsorbent fibrous nonwoven composite material 28 passes over drums 36–42 heated to a temperature ranging from about 150°–175° F. (65°–80° C.). Other drying processes which incorporate infra-red radiation, yankee dryers, through-air dryers, microwaves, and ultrasonic energy may also be used. The dried adsorbent fibrous nonwoven composite material 28 can then be removed and wound on a roll, packaged or introduced into other processes.

It may be desirable to use finishing steps and/or post-treatment processes to impart selected properties to the composite 28. For example, the web may be mechanically softened. This softening may be accomplished by calendering, perforating, aperturing, perf-embossing, embossing, pattern embossing, differential drawing, creping, and rollers. Softening may also be accomplished by adding debonding agents to the nonwoven fibrous web before or just after web formation. Alternatively and/or additionally, chemical post-treatments may be added to the web such as, for example, adhesives, dyes, surfactants, cross-linking agents, hydrating agents and/or pigments to impart or enhance desirable properties such as, for example, abrasion resistance, toughness, color, reduced linting or improved adsorption.

Figure 2:
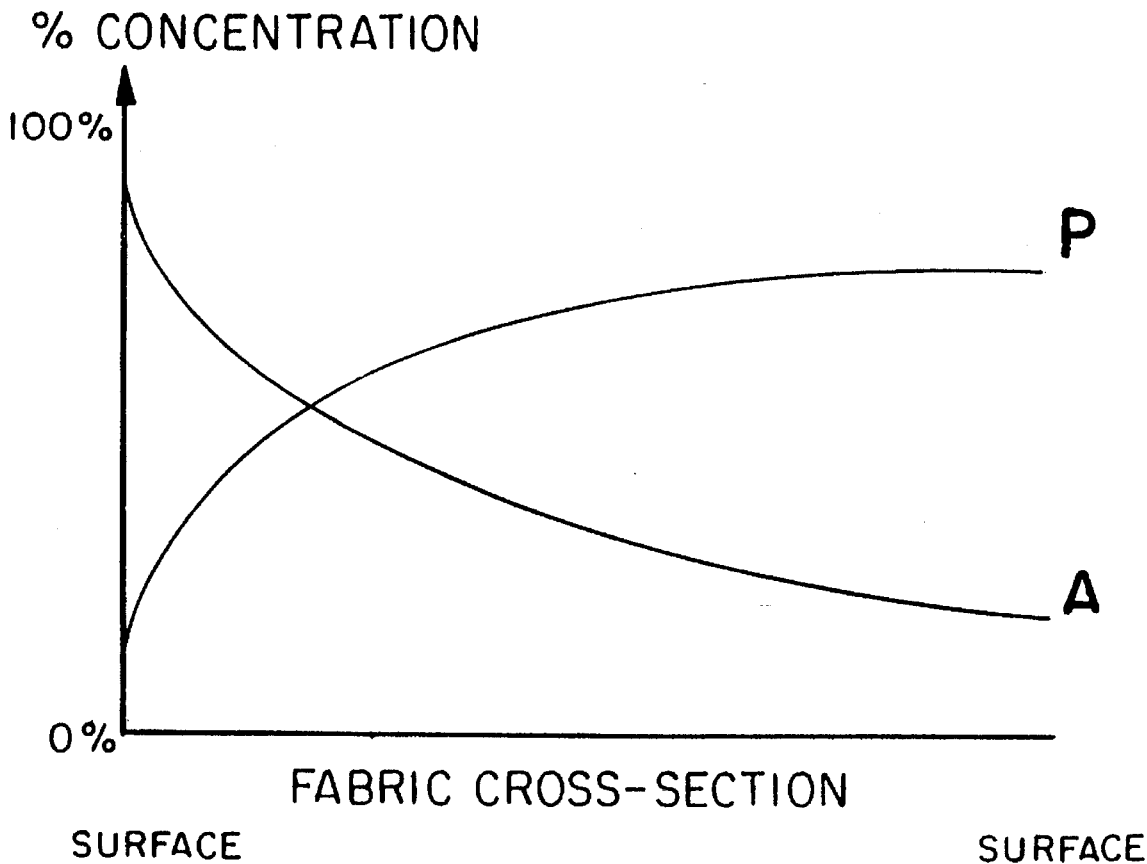
FIG. 2. is a general representation of an exemplary adsorbent material/pulp fiber concentration gradient for a cross section of an adsorbent fibrous nonwoven composite structure.

Instead of a homogenous adsorbent composite material, the present invention is directed to a nonwoven structure in which the components can be described as having an enhanced two-sided, graduated or heterogenous distribution. Although the inventors should not be held to a particular theory of operation, it is believed that the absence of wet-end additives in the pulp/adsorbent material aqueous suspension can have the effect that, during deposition of the suspension and subsequent vacuum dewatering, an enhanced two-sided or non-uniform (i.e., graduated, heterogenous) distribution of the fibrous component and adsorbent material can be accomplished. A general representation of an exemplary adsorbent material concentration gradient for a cross section such a fibrous nonwoven composite structure is illustrated in FIG. 2. Curve A represents the adsorbent material concentration and curve P represents the pulp concentration.

According to the present invention, the adsorbent fibrous nonwoven structure is adapted to adsorb an amount of carbon tetrachloride ($CCl_4$) vapor sufficient to increase the basis weight of the nonwoven structure by at least about one and one-half grams per square meter (i.e., 1.5 gsm). For example, the adsorbent fibrous nonwoven structure can be adapted to adsorb an amount of carbon tetrachloride ($CCl_4$) vapor sufficient to increase the basis weight of the nonwoven structure by about 10 to about 20 grams per square meter (i.e., 10–20 gsm). Desirably, the adsorbent fibrous nonwoven structure is adapted to adsorb an amount of carbon tetrachloride ($CCl_4$) vapor sufficient to increase the basis weight of the nonwoven structure by 25 grams per square meter or more (i.e., 25 gsm or more).

Figure 5:
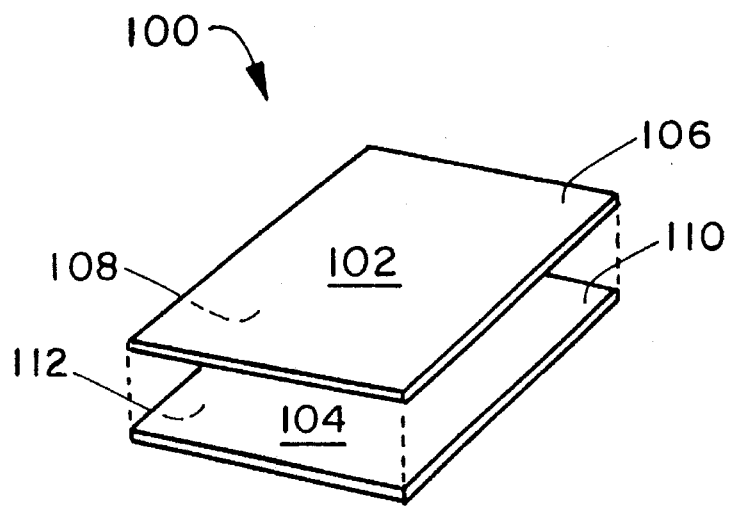
FIG. 5 is a representation of an exemplary adsorbent structure that contains multiple layers of an adsorbent fibrous nonwoven composite structure.
Figure 3:
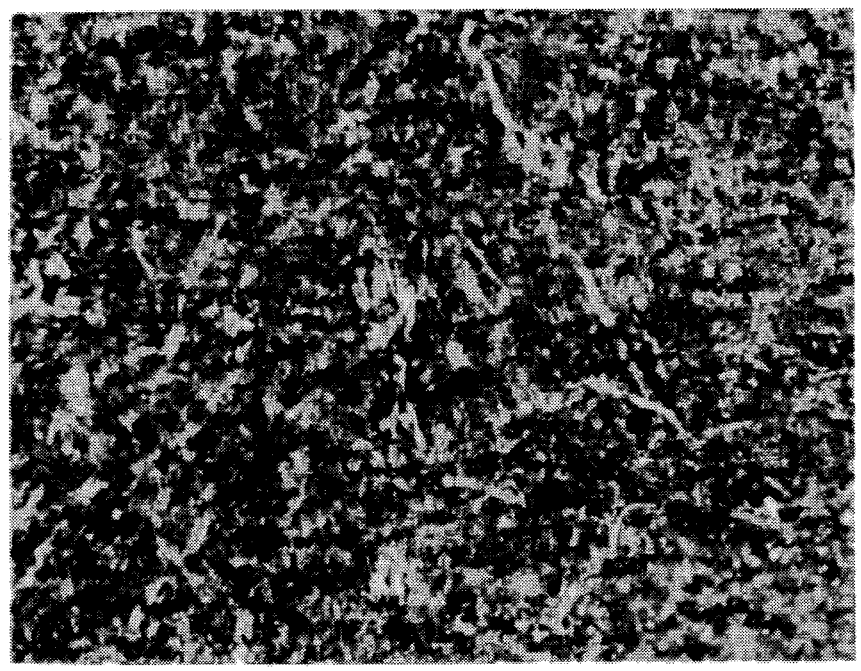
FIG. 3 is a photomicrograph of an adsorbent rich surface of an exemplary adsorbent fibrous nonwoven composite structure.
Figure 4:
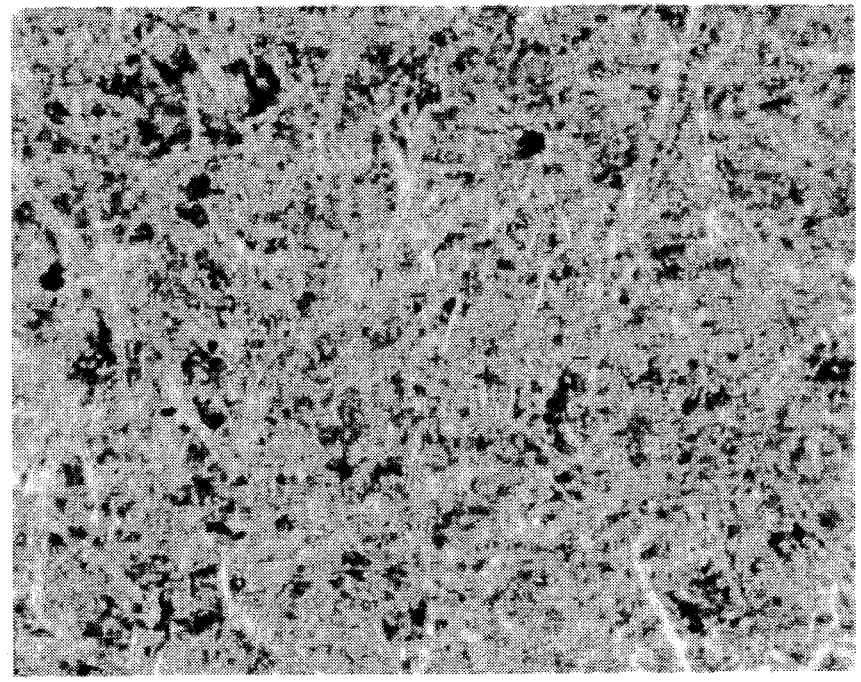
FIG. 4 is a photomicrograph of a pulp rich surface of an exemplary adsorbent fibrous nonwoven composite structure.

Referring now to FIGS. 3–5, those figures are microphotographs of various adsorbent fibrous nonwoven composite structures containing about 50 percent, by weight, adsorbent material (Calgon Carbon Type PCB Granular Activated Carbon available from Calgon Carbon of Pittsburgh, Pa.) and about 50 percent, by weight, wood pulp (Alberni K softwood pulp available from Kimberly Clark Corporation). More particularly, FIG. 3 is a 43× (linear magnification) photomicrograph of an adsorbent rich side of an exemplary adsorbent fibrous nonwoven composite structure. FIG. 4 is a 43× (linear magnification) photomicrograph of the opposite side (i.e., the pulp rich side) of the same exemplary adsorbent fibrous nonwoven composite structure. FIGS. 3 and 4 were produced at identical exposures. The exposure was set on the adsorbent rich side of the adsorbent fibrous nonwoven composite. As can be seen from FIGS. 3 and 4, the concentration of adsorbent material is greater on one surface (i.e., the adsorbent rich surface) of the structure than on the opposite surface (i.e., the adsorbent rich surface). Adsorbent material is also distributed throughout the pulp rich surface (as well as the inner portion of the structure) but at lower concentrations. Thus, it can be seen that the structure of FIGS. 3 and 4 can be described as a matrix of pulp fibers having a first exterior surface and a second exterior surface in which at least one adsorbent material has been integrated into the pulp fiber matrix so that the concentration of adsorbent material adjacent the first exterior surface of the nonwoven structure is greater, as determined by optical image analysis, than the concentration of adsorbent material adjacent the second exterior surface of the nonwoven structure.

Although the inventors should not be held to a particular theory of operation, it is believed that the structure of FIGS. 3 and 4 represents an enhanced two-sided or non-homogeneous distribution of adsorbent material within the matrix of pulp fibers as described above. While the distribution of adsorbent material within the pulp fiber matrix does not appear to follow a precise gradient pattern, it is believed that a cross-section of the structure would exhibit increasing concentrations of adsorbent material approaching its first exterior surface and increasing concentrations of pulp fibers approaching its second exterior surface. This distribution is believed to be especially advantageous because, although the concentration of adsorbent material adjacent the first exterior surface is reduced, sufficient amounts of adsorbent materials are still present so that the nonwoven structure has many of the desirable adsorbent characteristics of a generally homogenous structure while also providing desirable abrasion resistance properties due to the presence of enhanced concentrations of pulp fibers adjacent the second exterior surface of the structure.

FIG. 5 is an exploded perspective view of an exemplary adsorbent structure 100 which incorporates multiple layers of an adsorbent fibrous nonwoven composite material. FIG. 5 merely shows the relationship between the layers of the exemplary adsorbent structure and is not intended to limit in any way the various ways those layers (or other layers) may be configured in particular products. The exemplary adsorbent structure 100, shown here as a multi-layer composite suitable for use as an adsorbent liner, padding, filling, wadding, packing, stuffing or the like contains two layers, a top layer 102 and a bottom layer 104. The upper surface 106 of the top layer 102 may be the portion of the adsorbent structure 100 intended to be abrasion resistant. In that situation, the upper surface 106 of the top layer 102 would be the pulp rich surface of an individual adsorbent sheet. Alternatively, if abrasion resistance is not a consideration, the upper surface 106 of the top layer 102 could be the adsorbent rich surface of an individual adsorbent sheet. The lower surface 108 of the top layer 102 is superposed on the bottom layer 104. The bottom layer has an upper surface 110 in contact with the lower surface 108 of the top layer 102. The bottom layer 104 also has a lower surface 112 which forms an exterior surface of the multilayer absorbent structure 100. The lower surface 112 of the bottom layer 104 may also be a portion of the adsorbent structure 100 intended to be abrasion resistant. In that situation, the lower surface 112 of the bottom layer 104 would be the pulp rich surface of an individual adsorbent sheet. Alternatively, if abrasion resistance is not a consideration, the lower surface 112 of the bottom layer 104 could be the adsorbent rich surface of an individual adsorbent sheet. Each layer may be separately formed and joined to the other layers in any conventional manner. The layers may be cut or shaped before or after assembly to provide a particular adsorbent product configuration.

When the layers are assembled to form a product having the pulp rich surfaces of the individual adsorbent sheets as its exterior faces, an product having enhanced abrasion resistance is provided. When the layers are assembled to form a product having the adsorbent rich surfaces of the individual adsorbent sheets as its exterior faces, an product having enhanced adsorption is provided.

EXAMPLES

Tensile strength and elongation measurements of samples were made utilizing a Thwing-Albert Model QC-2XS Electron Digital Readout Tensile Strength Tester in accordance with TAPPI-T404 and ASTM-D828. The tester was equipped with Thwing Albert Catalog No. 733B Smooth Faced mechanical grips having a jaw with of about 1 inch (25.4 mm). Measurements of peak load were made in the machine direction for dry samples. Crosshead speed was set to about 51 mm/minute (2 inches/minute). Samples were conditioned at 50% relative humidity and 73° F. (23° C.) before testing. Tensile strength refers to the maximum load or force (i.e., peak load) encountered while elongating the sample to break. The results are expressed in units of force (pounds$_f$) for samples that measured 1 inch wide by 6 inches long.

Particles and fibers shed from sample fabrics were measured by a Climet Lint test in accordance with INDA Standard Test 160.0-83 except that the sample size is 6 inch by 6 inch instead of 7 inch by 8 inch.

The basis weights of samples were determined for samples dried in an oven heated to 105° C. until no further weight loss is apparent after continued drying. This condition is generally referred to as "bone-dry" condition. Generally speaking, the basis weights were determined essentially in accordance with ASTM D646, ASTM D202 and TAPPI T411.

Abrasion resistance testing was conducted on a Rotary Platform, Double-Head (RPDH) Abraser: Taber Abraser No. 5130, with Model No. E 140-14 specimen holder, available from Teledyne Taber, North Tonawanda, N.Y. The abrasive wheel was a non-resilient, vitrified, Calibrade grinding wheel No. h-18, medium grade/medium bond, also available from Teledyne Taber. The test was run without counterweights. Samples measured approximately 5 inches×5 inches (12.7 cm×12.7 cm). Testing was conducted generally in accordance with Method 5306, Federal Test Methods Standard No. 191A.

Thickness of the samples was determined utilizing a Model 49–70 thickness tester available from TMI (Testing Machines Incorporated) of Amityville, N.Y. The thickness was measured using a 2-inch diameter circular foot at an applied pressure of about 0.2 pounds per square inch (psi).

Porosity of the adsorbent fibrous nonwoven composite structure was measured in accordance with the CORESTA permeability test procedure utilizing a Bendix-Sheffield variable area porosimeter, Model 60080005, available from Bendix Automation and Measurement Division, Dayton, Ohio.

Adsorption of carbon tetrachloride vapor was determined utilizing samples measuring roughly 100 mm long and 62 mm wide. A hole was punched near the top center of each sample and it was hung in a sheet dryer for five (5) minutes. (A 100° C. circulating oven may be used if a sheet dryer is not available.) Samples were removed from the dryer and then mounted on a balance hook so that they were separated. The samples were weighed after exposure to ambient air for ten (10) minutes.

A small amount of carbon tetrachloride ($CCl_4$) was placed in the bottom of a 1000 ml resin kettle. Sufficient $CCl_4$ was added so that liquid $CCl_4$ is present throughout the test and liquid $CCl_4$ completely covered the bottom of the resin kettle. Generally speaking, about 25–40 milliliters of $CCl_4$ was adequate.

The resin kettle was raised up to enclose the samples and to obtain a crude seal between the rim of the kettle and the underside of the balance support. A lab jack platform was raised to support the kettle. The samples were exposed to $CCl_4$ vapor for ten (10) minutes and then weighed. Adsorption of $CCl_4$ vapor (i.e., $CCl_4$ pickup) was calculated from the difference between the initial sample weight and the final sample weight.

EXAMPLE 1

An adsorbent sheet was formed from a dilute aqueous suspension containing about 17 percent (based on the total weight of the material suspended in water) Calgon Carbon Type PCB Granular Activated Carbon available from Calgon Carbon of Pittsburgh, Pa. and about 83 percent Alberni K softwood pulp available from Kimberly Clark Corporation.

The dilute suspension of fibers and adsorbent materials was formed into a sheet utilizing a conventional Fourdrinier-type papermaking machine. The Fourdrinier-type machine utilized a conventional forming fabric and vacuum dewatering.

After the water was drained from the wet-laid composite material, it was transferred to a conventional steam can drying operation in which the steam cans were heated to about 150°–175° F. (65°–80° C.). Physical properties and test results reported in the following tables for this material are identified as "Sample 1".

EXAMPLE 2

An adsorbent sheet was formed from a dilute aqueous suspension containing about 50 percent (based on the total weight of the suspended material in the slurry) Calgon Carbon Type PCB Granular Activated Carbon available from Calgon Carbon of Pittsburgh, Pa. and about 50 percent Alberni K softwood pulp available from Kimberly Clark Corporation. The sheet was formed from the dilute aqueous suspension utilizing the same procedure as in Example 1. Physical properties and test results reported in the following tables for this material are identified as "Sample 2".

EXAMPLE 3

An adsorbent sheet was formed from a dilute aqueous suspension containing about 50 percent (based on the total weight of the suspended material in the slurry) Nuchar SA 20 Granular Activated Carbon available from Westvaco Corporation, Chemical Division, Covington, Va. and about 50 percent Alberni K softwood pulp available from Kimberly Clark Corporation. The sheet was formed from the dilute aqueous suspension utilizing the same procedure as in Example 1. Physical properties and test results reported in the following tables for this material are identified as "Sample 3".

EXAMPLES 4–24

Adsorbent sheets were formed from dilute aqueous suspensions containing a given percentage (based on the total weight of the suspended material in the slurry) of a particular activated and a given percentage of Alberni K softwood pulp available from Kimberly Clark Corporation. The sheet was formed from the dilute aqueous suspension utilizing the same procedure as in Example 1. Samples 4–11 contained Calgon Carbon Type PCB Granular Activated Carbon available from Calgon Carbon of Pittsburgh, Pa. Samples 12–14 contained HMC Carbon available from Calgon Carbon. Samples 15 and 16 contained SGL Carbon available from Calgon Carbon. Samples 17, 18, 21 and 22 contained Calgon Carbon Type PCB Granular Activated. Samples 19, 20, 23 and 24 contained Nuchar SA 20 Granular Activated Carbon available from Westvaco Corporation. Physical properties and test results reported in Table 6 for these materials are identified as "Sample 4–24". Samples 17–20 were tested for $CCl_4$ vapor adsorption using the procedure described above. Results of that testing is reported in Table 7.

CONTROL SAMPLES

Paper sheets were formed from dilute aqueous suspensions containing Alberni K softwood pulp available from Kimberly Clark Corporation. The sheets were formed from the dilute aqueous suspension utilizing the same procedure as in Example 1. Physical properties and test results reported in Table 6 for these materials are identified as "Control 1" and "Control 2".

TABLE 1

Sample 1

| 10 μm LINT COUNT NUMBER OF PARTICLES | 0.5 μm LINT COUNT NUMBER OF PARTICLES | DRY TABER 0.5" HOLE CYCLES DARK | DRY TABER 0.5" HOLE CYCLES LIGHT |
|---|---|---|---|
| 1697 | 79282 | 40 | 43 |
| 2024 | 95764 | 46 | 36 |
| 1252 | 84055 | 43 | 52 |
| 1617 | 86743 | 64 | 50 |

TABLE 1-continued

Sample 1

| 10 μm LINT COUNT NUMBER OF PARTICLES | 0.5 μm LINT COUNT NUMBER OF PARTICLES | DRY TABER 0.5" HOLE CYCLES DARK | DRY TABER 0.5" HOLE CYCLES LIGHT |
|---|---|---|---|
| 2087 | 97890 | 53 | 80 |
| 1152 | 86762 | 43 | 47 |
| 1720 | 86018 | 36 | 62 |
| 1100 | 82183 | 34 | 55 |
| 1509 | 93231 | 49 | 67 |
| 1327 | 92799 | 53 | 56 |

TABLE 2

Sample 2

| 10 μm LINT COUNT NUMBER OF PARTICLES | 0.5 μm LINT COUNT NUMBER OF PARTICLES | DRY TABER 0.5" HOLE CYCLES DARK | DRY TABER 0.5" HOLE CYCLES LIGHT |
|---|---|---|---|
| 4749 | 115642 | 28 | 29 |
| 5278 | 116856 | 43 | 42 |
| 3351 | 115424 | 38 | 41 |
| 2658 | 115013 | 39 | 32 |
| 3687 | 116505 | 38 | 39 |
| 1900 | 116197 | 30 | 29 |
| 2627 | 122497 | 34 | 33 |
| 3165 | 115967 | 34 | 37 |
| 3413 | 119665 | 43 | 36 |
| 2757 | 118871 | 33 | 38 |

TABLE 3

Sample 3

| 10 μm LINT COUNT NUMBER OF PARTICLES | 0.5 μm LINT COUNT NUMBER OF PARTICLES | DRY TABER 0.5" HOLE CYCLES DARK | DRY TABER 0.5" HOLE CYCLES LIGHT |
|---|---|---|---|
| 4799 | 132764 | 52 | 56 |
| 4795 | 136105 | 55 | 73 |
| 6935 | 139585 | 56 | 66 |
| 6275 | 136899 | 65 | 65 |
| 5719 | 139784 | 59 | 62 |
| 1620 | 138352 | — | — |
| 4252 | 136852 | — | — |
| 7807 | 137555 | — | — |
| 7621 | 140014 | — | — |
| 4805 | 138312 | — | — |

TABLE 4

| SAMPLE | | 10 μm LINT | 0.5 μm LINT | DRY TABER 0.5" HOLE DARK | DRY TABER 0.5" HOLE LIGHT |
|---|---|---|---|---|---|
| 1 | Mean | 1549 | 89473 | 46 | 55 |
|   | SD* | 345 | 6617 | 9 | 13 |
| 2 | Mean | 3359 | 117264 | 36 | 36 |
|   | SD* | 1016 | 2366 | 5 | 5 |
| 3 | Mean | 5913 | 137622 | 57 | 64 |
|   | SD* | 1258 | 2167 | 5 | 6 |

*Standard Deviation

TABLE 5

| Sample | % Carbon | Basis Weight gsm | Tensile g/in | CORESTA cm/min | Thickness mils |
|---|---|---|---|---|---|
| 4 | 53 | 47.5 | 1850 | 65 | |
| 5 | 57 | 49.7 | 2225 | 65 | 5.9 |
| 6 | 50 | 52.8 | 2400 | 44 | 6.0 |
| 7 | 26 | 57.2 | | | |
| 8 | 32 | 52.9 | 3350 | 29 | 5.9 |
| 9 | 30 | 52.5 | 3450 | 40 | 6.0 |
| 10 | 17 | 50.4 | 3475 | 27 | 6.2 |
| 11 | 17 | 50.9 | 3475 | 44 | 6.0 |
| 12 | 48 | 50.6 | 2100 | 89 | 6.3 |
| 13 | 51 | 55.4 | 2200 | 88 | |
| 14 | 54 | 51.0 | | 84 | 6.2 |
| 15 | 52 | 52.5 | 2500 | 36 | 6.5 |
| 16 | 54 | 51.9 | | 76 | |
| 17 | 60 | 49.5 | 2483 | 140 | 5.9 |
| 18 | 57 | 50.1 | 2700 | 78 | 7.2 |
| 19 | 52 | 53.7 | 3150 | 64 | 7.6 |
| 20 | 55 | 54.5 | 3483 | 94 | 7.6 |
| 21 | 66 | 49.5 | 2483 | 140 | 5.9 |
| 22 | 57 | 50.1 | 2700 | 78 | 7.2 |
| 23 | 52 | 53.7 | 3150 | 60 | 7.6 |
| 24 | 55 | 54.5 | 3483 | 80 | 7.6 |
| Control 1 | | 49.6 | 5050 | 5 | 4.3 |
| Control 2 | | 42.9 | 5050 | 4 | 4.4 |

TABLE 6

| Sample | CCl$_4$ Adsorption gsm |
|---|---|
| 17 | 18.2 |
| 18 | 17.8 |
| 19 | 34.2 |
| 20 | 37.2 |

ANALYTICAL IMAGE ANALYSIS

Samples were formed from a dilute aqueous suspension containing about 50 percent (based on the total weight of the suspended material in the slurry) Calgon Carbon Type PCB Granular Activated Carbon available from Calgon Carbon of Pittsburgh, Pa. and about 50 percent Alberni K softwood pulp available from Kimberly Clark Corporation utilizing the same procedure as in Example 1. Concentrations of pulp fibers and adsorbent material adjacent each exterior surface of twenty-two samples were determined by analytical image analysis. In this analytical technique, an image was generated utilizing a Leica Wild M420 macro imaging system at approximately 20× (linear) magnification for each side of a randomly selected portion of each 8 inch by 11 inch (20 cm×28 cm) sample. Oblique illumination was provided from two opposed bifurcated light guides configured at a 45 degree angle from the sample. The light guides were equipped with detachable lenses and were attached to a Fostec 8375 light source. The generated image was processed by a Cambridge Quantimet-10 image analyzer available from Leica, Inc. of Deerfield, Ill.

The threshold was set on the carbon-rich side of the sample and adjusted so that the black particles were clearly detected. The carbon area percent was measured for each side of the paper. An assumption was made that the sum of these two measurements represents 100% of the carbon on both sides of each paper. Consequently, the ratio of carbon to total carbon would be a measure of the carbon distribution between the two sides. The raw data is attached as table 1. The higher carbon side of these papers was found to contain 66% of the total carbon by this technique. The experimental variability was observed to be 3%.

Samples analyzed by image analysis were substantially flat sheets without bumps, crumples, wrinkles, projections or rugosities that could create shadows or shaded areas to distort the optical analysis. The samples contained activated carbon granules which are black and pulp fibers which are white. If other adsorbents and/or fibers having little contrast are used, it is contemplated that dyes or stains could be added to color either the adsorbent or the fiber matrix so sufficient contrast exists between the components to permit meaningful image analysis.

TABLE 7

| Sample | % Carbon Dark | % Carbon Light | % Carbon in Darker Side |
|---|---|---|---|
| A | 0.518 | 0.299 | 63 |
| B | 0.531 | 0.238 | 69 |
| C | 0.512 | 0.264 | 66 |
| D | 0.518 | 0.193 | 73 |
| E | 0.530 | 0.297 | 64 |
| F | 0.506 | 0.266 | 66 |
| G | 0.486 | 0.277 | 64 |
| H | 0.510 | 0.218 | 70 |
| I | 0.470 | 0.286 | 62 |
| J | 0.509 | 0.311 | 62 |
| K | 0.527 | 0.259 | 67 |
| L | 0.494 | 0.318 | 61 |
| M | 0.524 | 0.286 | 65 |
| N | 0.467 | 0.223 | 68 |
| O | 0.512 | 0.268 | 66 |
| P | 0.526 | 0.259 | 67 |
| Q | 0.483 | 0.286 | 63 |
| R | 0.498 | 0.245 | 67 |
| S | 0.497 | 0.244 | 67 |
| T | 0.501 | 0.279 | 64 |
| U | 0.508 | 0.263 | 66 |
| V | 0.498 | 0.235 | 68 |
| | | | Average 66% ± 3% |

As can be seen from the Tables, the adsorbent nonwoven fibrous structures of the present invention can provide useful loadings of adsorbent materials in a fiber matrix having desirable levels of tensile strength, thickness (i.e., thinness) and porosity. The enhanced two-sidedness or non-homogenous distribution of the adsorbent nonwoven fibrous structures is believed to preserve the structural integrity of the fiber matrix having a high fiber concentration (adjacent a first exterior surface) while permitting high loadings of adsorbent material in the opposite portion of the fiber matrix (adjacent a second exterior surface).

The tensile strength of the adsorbent structure was generally less than the tensile strength of the control material. The change in strength varied with the amount and type of adsorbent added to the pulp fibers. Some of the samples more than 60 percent of the strength of the control at carbon loadings exceeding 50 percent.

Generally speaking, the thickness of the adsorbent structure was about 25 to about 75 percent more than the thickness of the control material. The porosity of the adsorbent structure was substantially greater than the porosity of the control material. The porosity increased from about 500 to about 3500 percent. The changes in tensile strength, thickness and porosity varied with the amount and type of adsorbent added to the pulp fibers.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. An adsorbent fibrous nonwoven composite structure comprising:

a matrix of pulp fibers having a first exterior surface and a second exterior surface; and at least one adsorbent material integrated into the pulp fiber matrix so that the concentration of adsorbent material adjacent the first exterior surface of the nonwoven structure is at least about 70 percent, as determined by optical image analysis, and the concentration of adsorbent material adjacent the second exterior surface of the nonwoven structure is less than about 30 percent, as determined by optical image analysis.

2. The fibrous nonwoven composite structure of claim 1 wherein the concentration of adsorbent material adjacent the first exterior surface is from about 70 to about 85 percent, as determined by optical image analysis, and the concentration of adsorbent material adjacent the second exterior surface is from about 30 to about 15 percent, as determined by optical image analysis.

3. The adsorbent fibrous nonwoven composite structure of claim 1, wherein the structure comprises from about 20 to about 90 percent, by weight pulp fibers and from about 10 to about 80 percent, by weight, adsorbent material, based on the total weight of the structure.

4. The adsorbent fibrous nonwoven composite structure of claim 3, wherein the structure comprises from about 40 to about 80 percent, by weight pulp fibers and from about 20 to about 60 percent, by weight, adsorbent material, based on the total weight of the structure.

5. The adsorbent fibrous nonwoven composite structure of claim 1, wherein the structure has a basis weight from about 20 gsm to about 100 gsm.

6. The adsorbent fibrous nonwoven composite structure of claim 1, wherein the adsorbent material is activated carbon.

7. The adsorbent fibrous nonwoven composite structure of claim 1, wherein the composite has a lint loss of less than about 6250 particles of 10 micron size per 0.01 ft$^3$ of air as determined in accordance with dry Climet Lint test methods.

8. A nonwoven composite material comprising at least two layers of the adsorbent fibrous nonwoven composite structure according to claim 1.

9. An adsorbent fibrous nonwoven composite structure comprising:

from about 20 to about 90 total weight percent, pulp fibers forming a matrix having a first exterior surface and a second exterior surface; and from about 10 to about 80, total weight percent, adsorbent material integrated into the pulp fiber matrix so that the concentration of adsorbent material adjacent the first exterior surface of the nonwoven structure is at least about 70 percent, as determined by optical image analysis, and the concentration of adsorbent material adjacent the second exterior surface is less than about 30 percent, as determined by optical image analysis.

10. The adsorbent fibrous nonwoven composite structure of claim 9 wherein the concentration of adsorbent material adjacent the first exterior surface is from about 70 to about 85 percent, as determined by optical image analysis, and the concentration of adsorbent adjacent the second exterior surface is from about 30 to about 15 percent, as determined by optical image analysis.

11. The adsorbent fibrous nonwoven composite structure of claim 9, wherein the structure comprises from about 40 to about 80 percent, by weight pulp fibers and from about 20 to about 60 percent, by weight, adsorbent material, based on the total weight of the structure.

12. The adsorbent fibrous nonwoven composite structure of claim 9, wherein the structure has a basis weight from about 20 gsm to about 100 gsm.

13. The adsorbent fibrous nonwoven composite structure of claim 9, wherein the adsorbent material is activated carbon.

14. The adsorbent fibrous nonwoven composite structure of claim 9, wherein the composite has a lint loss of less than about 6250 particles of 10 micron size per 0.01 ft$^3$ of air as determined in accordance with dry Climet Lint test methods.

15. A nonwoven composite material comprising at least two layers of the adsorbent fibrous nonwoven composite structure according to claim 9.

16. The fibrous nonwoven composite structure of claim 14 wherein the composite has a lint loss of less than about 4000 particles of 10 micron size per 0.01 ft$^3$ of air and less than about 120000 particles of 0.5 micron size per 0.01 ft$^3$ of air as determined in accordance with dry Climet Lint test methods.

17. The fibrous nonwoven composite structure of claim 16 wherein the composite has a lint loss of less than about 2000 particles of 10 micron size per 0.01 ft$^3$ of air and less than about 90000 particles of 0.5 micron size per 0.01 ft$^3$ of air as determined in accordance with dry Climet Lint test methods.

* * * * *